No. 753,055.

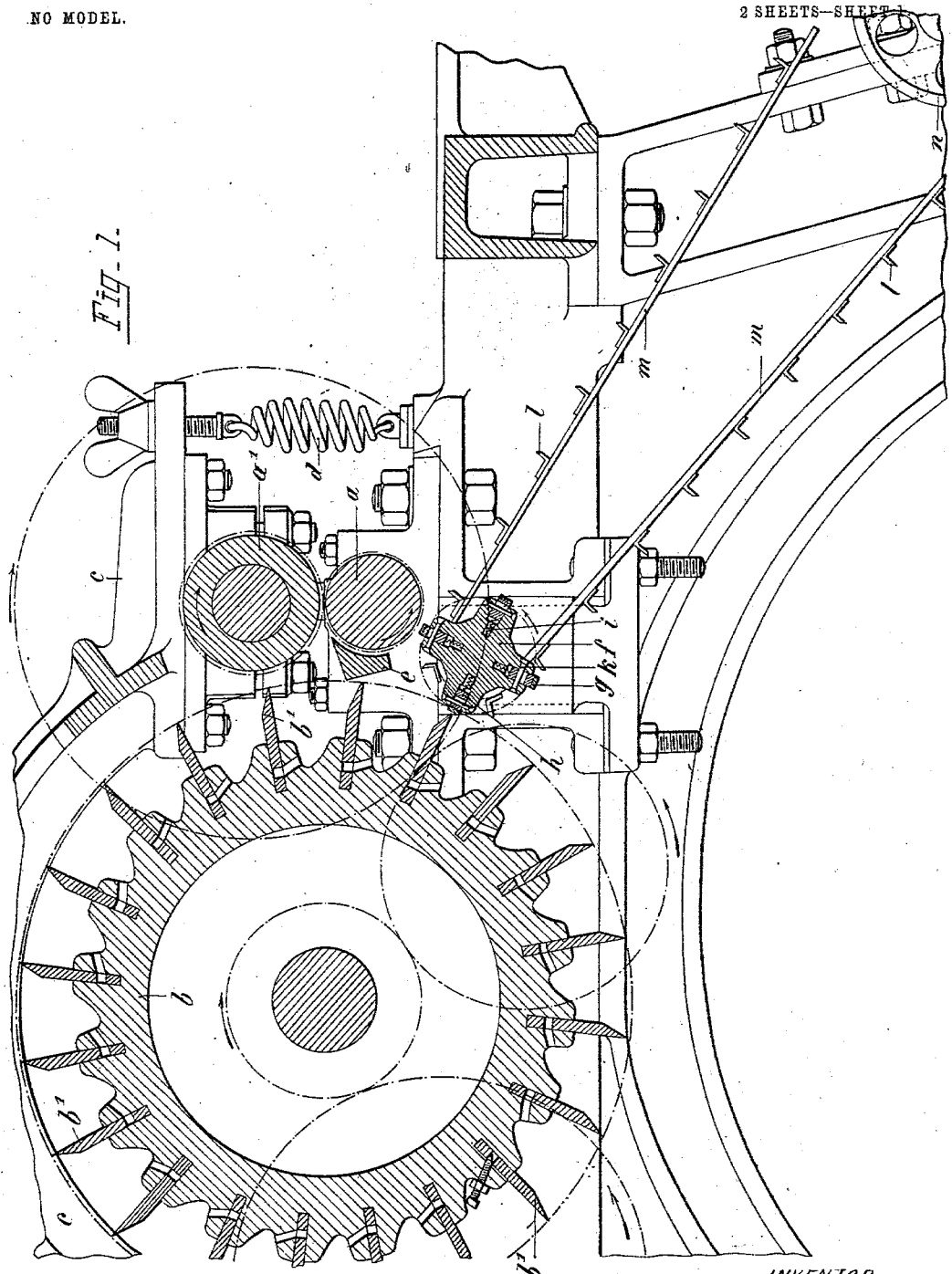

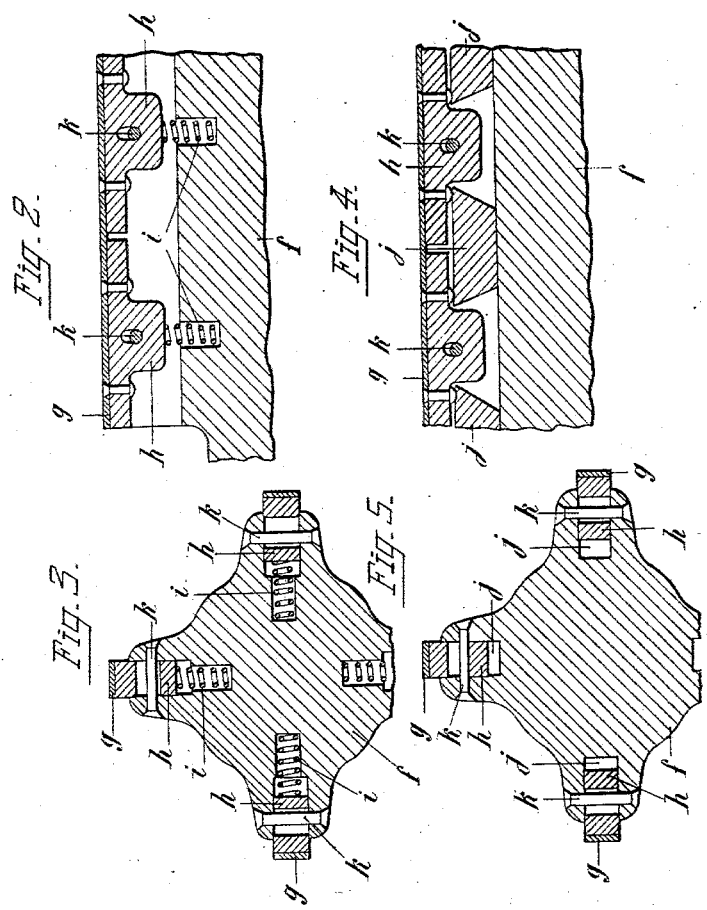

Patented February 23, 1904.

UNITED STATES PATENT OFFICE.

ALFRED DIEUDONNÉ ESTIENNE, OF MARSEILLES, FRANCE, ASSIGNOR TO ANGLO-FRENCH RAMIE MACHINE COMPANY, LIMITED, OF PARIS, FRANCE.

DECORTICATING-MACHINE.

SPECIFICATION forming part of Letters Patent No. 753,055, dated February 23, 1904.

Application filed March 13, 1902. Serial No. 98,038. (No model.)

*To all whom it may concern:*

Be it known that I, ALFRED DIEUDONNÉ ESTIENNE, engineer, of 9 Rue Jean Martin, in the city of Marseilles, Republic of France, have invented Improvements in Machines for Decorticating Ramie and the Like, of which the following is a full, clear, and exact description.

My invention relates to an improved machine for decorticating ramie and other plants, leaves, or textile materials, effecting a regular and complete decortication of all the leaves or stalks introduced into the apparatus and a ready separation of the hackled material.

In my improved machine the leaves or stalks to be decorticated are seized by feed-rollers and presented at a given speed and caused to overhang the path of action of a beating-drum provided with blades which in their rotation break open the stalks. The wood and pith are thrown out by the blows, and the bundles or strips of fibers which have not been injured by reason of the free space left between the blades and the scutching-board are then seized between the edges of the blades of the beater and an elastic pallet or paddle carried on a spindle arranged parallel to the shaft of the beater. The aforesaid blades of the beater and the elastic pallets or paddles revolve at a greater tangential velocity than the feed-rollers, so as to exercise a stripping or scraping action upon the bundles and to strip off therefrom the husk or pellicle in which the fibers are incased. My improved machine is characterized by the special arrangement of these elastic pallets, each of which offers an unbroken surface, elastic or resilient at all points, in such a manner that the scraping effort exercised upon each leaf or stalk is independent of the effort exercised upon the adjacent leaves or stalks and is the same whatever the number of leaves or stalks introduced at one time into the machine.

Referring to the accompanying drawings, Figure 1 is a vertical section showing a convenient form or arrangement of my improved machine. Figs. 2 and 3 are detail views showing the spindle carrying the elastic pallets or paddles in longitudinal and transverse section, respectively. Figs. 4 and 5 illustrate a modified form of said spindle.

Like letters of reference indicate like parts in the various figures.

As shown in the drawings, my improved machine comprises two feed-rollers $a\ a'$, rotating at a definite speed and arranged to seize the stalks fed thereto and to carry said stalks to be acted upon by the beating-cylinder $b$. The lower feed-roller $a$ turns in fixed bearings, and the upper roller $a'$ turns in bearings supported by a pivoted frame $c$, controlled by tension-springs $d$ in such a manner as to feed in and at the same time slightly compress stalks of varying diameters. The stalks thus fed by the feed-rollers $a\ a'$ are passed onto the scutching-board $e$, and all parts of the stalks which traverse this board and which consequently overhang beyond the same are broken by the blows of the blades $b'$ of the beating-cylinder $b$ and reduced to bundles or strips of fibers.

The blades $b'$ are adjustable and are preferably of such a length and thickness as to permit them to be somewhat flexible in order to assist the decortication and the separation of the strips of fibers. Moreover, the edges of these blades are blunt or beveled, so as not to cut the textile material.

The blades $b'$ of the beater strike successively the stalks overhanging the scutching-board $e$ and break them up, and under the action of the blows the wood and the pith are thrown out without destroying the fibers, a free space being provided between the ends of the blades $b'$ of the beater and the board $e$ sufficient to permit the passage of the said fibers. The stalks thus converted to strips are afterward seized between the end of one of the blades $b'$ of the beater and one of the elastic pallets upon the spindle $f$. Each of these pallets consists of a yielding metallic blade $g$, carrying along its whole length stops or projections $h$, leaving a small free space between them, which permits the metallic blade to be flexibly supported. These projections rest on elastic supports consisting of spiral springs $i$, Figs. 1, 2, and 3, or of blocks of caoutchouc $j$, Figs. 4 and 5, and each is provided with a recess or hole through which is passed a pin $k$, mounted in the ribs or flanges of the spindle $f$. These elastic supports $i$ or $j$ and the projections $h$ are set, as shown in the drawings, between the ribs or flanges on the spindle $f$. Each pallet or paddle therefore presents an unbroken surface or yielding at all parts in such a manner that the pressure exercised upon each stalk after it has been converted into a strip and introduced between the end of a blade of the beater and this yielding surface is independent of that exercised upon the adjacent strip, even when the latter is of a different thickness.

The blades $b'$ of the beating-cylinder and the blades $g$ of the pallets of the spindle $f$ have the same tangential velocity and are arranged in such a manner that a blade $b'$ and a pallet simultaneously pass a line joining their axes. The tangential velocity of these blades and of the pallets being greater than that of the feed-rollers and the strips being held back, together with the part which is still stalk—that is to say, containing still the wood—by the feed-rollers $a$ $a'$, a continual rubbing or stripping action is set up, which removes all the husk remaining upon the fiber. Moreover, since the contact-surface of each pallet is resilient or yielding at all points, the stripping action thus exercised is independent of that exercised upon the adjacent strips and will always be the same whatever the number of the stalks distributed across the machine. The fibers after having been subjected to this stripping action are removed by the cross-pieces $l$, formed, for example, of angle-iron mounted upon endless belts $m$, carried at one end upon the spindle $f$ and at the other end upon pulleys $n$. After having been submitted to the joint action of the beater-blade and the corresponding elastic pallet of the spindle $f$ the bundles or strips of fibers thus converted into hackled material are deflected by one of the cross-bars $l$, which thus prevents them from being wound upon the spindle $f$. The hackled fibers then issue from the machine completely stripped of all husk.

It is to be understood that I can apply my improved elastic pallet or paddle to other forms of decorticating-machines.

I claim—

1. A decorticating-machine, comprising feed-rollers, a rotary beater, a scutching-board between the feed-rollers and beater, a spindle below said board and having channels, blades in said channels, the said blades having transverse openings, pins passing through said openings, and spring-supports for said blades.

2. A decorticating-machine, comprising feed-rollers, a rotary beater, a scutching-board between the feed-rollers and beater, a spindle below said board and having channels, yielding blades in said channels and having heels provided with transverse openings, pins passing through said openings, and spring-supports for said blades.

The foregoing specification of my improvements in machines for decorticating ramie and the like signed by me this 25th day of February, 1902.

ALFRED DIEUDONNÉ ESTIENNE.

Witnesses:
EMILE GASCHE,
CHARLES GUÉRINS.